March 13, 1962

H. S. McCONKIE 3,024,831

MEANS FOR EXPANDING THE BEADS OF TUBELESS TIRES ON WHEEL RIMS

Filed Jan. 22, 1958

INVENTOR
Howard S. McConkie

BY *Mirie & Shirley*
ATTORNEY

March 13, 1962 H. S. McCONKIE 3,024,831
MEANS FOR EXPANDING THE BEADS OF TUBELESS
TIRES ON WHEEL RIMS
Filed Jan. 22, 1958 3 Sheets-Sheet 2
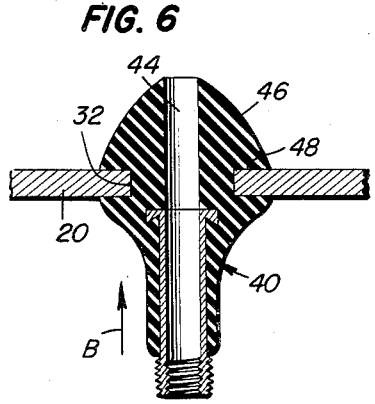
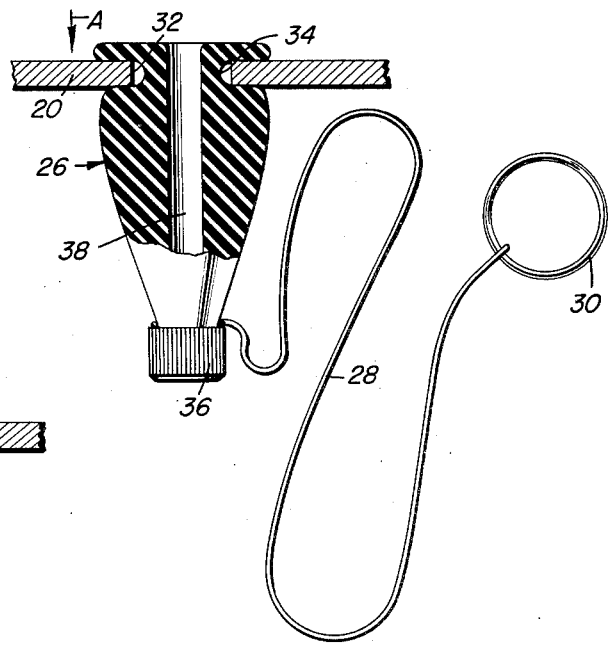
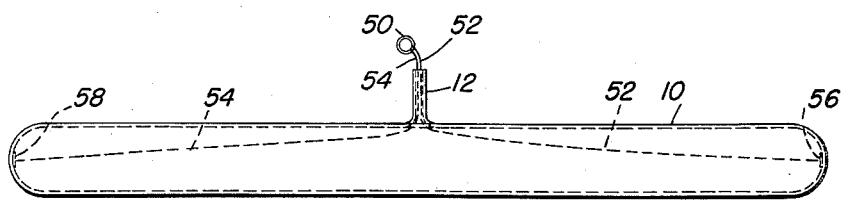
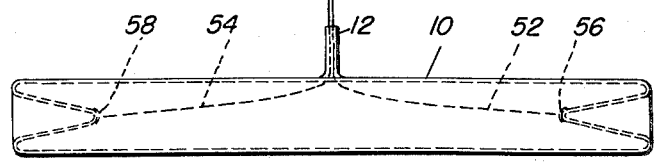
INVENTOR
Howard S. McConkie
BY *[signature]*
ATTORNEY March 13, 1962 H. S. McCONKIE 3,024,831
MEANS FOR EXPANDING THE BEADS OF TUBELESS
TIRES ON WHEEL RIMS
Filed Jan. 22, 1958 3 Sheets-Sheet 3

INVENTOR
Howard S. McConkie
BY
ATTORNEY

United States Patent Office 3,024,831
Patented Mar. 13, 1962

3,024,831
MEANS FOR EXPANDING THE BEADS OF TUBELESS TIRES ON WHEEL RIMS
Howard S. McConkie, 7 Pelham St., Fort Bragg, N.C.
Filed Jan. 22, 1958, Ser. No. 710,512
3 Claims. (Cl. 152—415)

This invention relates to means for installing tires and more particularly to a new method and apparatus for mounting a tubeless type tire on vehicle rims in such manner as to permit inflation and completion of the wheel assembly.

Many automotive vehicles are presently equipped with tubeless type tires, which are channel shaped in cross section and held to the wheel rim by the outward pressure developed when the tire is inflated, the rim being the closure member for the open portion of the tire channel. When a tire is installed, the tire rests loosely in the wheel rim and is difficult, if not impossible, to inflate because the loose engagement of the tire to the rim permits leakage of the inflating air. To overcome this difficulty, there have been proposed a number of compression tools of the type which include a loop of strap metal or cable which may be applied to the periphery of the tire at the tread and shortened to squeeze the tire toward the center of the wheel. This effects the bulging of the side walls of the tire to move its free edges into air sealing engagement against the rim. Such tools have certain disadvantages.

It is necessary to apply the loop manually to accurately position the loop along the center of the tire tread, and to hold it in this position until the loop has been shortened sufficiently to squeeze the tire. This generally requires the efforts of two men, one to position and hold the loop, and the other to take up the loop by means of a lever, ratchet, drum or similar device.

The present invention avoids the stated disadvantages of the loop type compression tool by employment of an inflatable bag or tube which is inserted in the tire during the mounting thereof, and which upon inflation forces the tire edges into air sealing engagement with the rim flanges. The tube may then be deflated and removed from the tire by withdrawal through the rim aperture which normally seats the tire valve stem. After withdrawal of the expanding tube, the tire valve stem is inserted in the rim aperture and the tire is inflated.

The primary object of the invention is to provide a new method, utilizing an expandable tube for insertion in a tubeless type tire, to effect its proper mounting, the tube being so constructed as to permit deflation and withdrawal from the wheel assembly through a rim aperture.

Another object is to provide a tire expander of the character indicated which will enable easy and effective mounting of a tubeless type tire, without need for complicated, expensive or difficult to operate tools or machines.

A further object is to provide an installing device of the character indicated which is operable to install and mount a tubeless type tire utilizing the efforts of only one person.

A still further object is to provide a method and means for installing tubeless type tires which shall be extremely economical to use and so inexpensive as to permit discarding of said means after only a few, or even a single installation.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 5 is an enlarged axial section of the tire valve stem after it has been seated in the rim aperture;

FIG. 6 is a sectional view similar to that of FIG. 5 of a modified tire valve stem;

FIG. 7 is a reduced plan view of a modified expander tube;

FIG. 8 is a diagrammatic plan view of the expander tube shown in FIG. 7 when subjected to withdrawal force;

Figure 1:
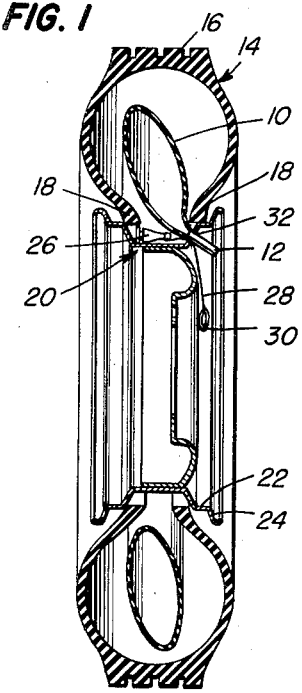
FIG. 1 is a transverse section through the axis of a wheel assembly showing a tubeless type tire in an intermediate stage of assembly while utilizing the method and means of the invention.

Referring now to the drawings, there is shown in FIGS. 1–5, a tire in intermediate stages of mounting while using the method and apparatus of the invention. The method contemplates use of an expander tube 10 which is preferably formed of thin, tough, flexible or resilient material, such as a rubber or thermoplastic composition. The tubular body is closed at both ends, but is provided at the ends or intermediate thereof with a stem 12 having a passage therethrough for filling the body with fluid to expand the tire. The dimensions of the tube 10 are such that when inflated or otherwise filled, as by a liquid, it will occupy the entire internal peripheral length of the tire being expanded, as well as the internal cross sectional diameter of the tire.

Preferably, the expander tube is formed with very thin walls to reduce its size when deflated. It should also be tough and durable to withstand frictional engagement with the rim and tire inner surfaces during withdrawal of the expander tube through a rim aperture. Materials of such nature are readily available, and the tube can be manufactured very inexpensively.

Figure 4:
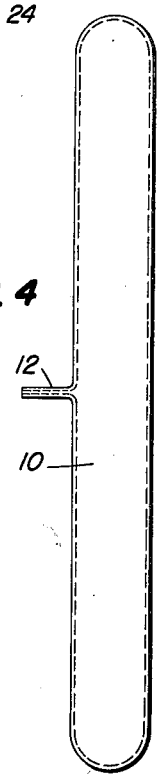
FIG. 4 is a plan view of the expander tube used in FIGS. 1–3.

This will enable discarding of the expander tube after a few, or even only one, operation should the tube be ruptured during withdrawal. The expander tube 10 may be straight, as shown in FIG. 4, or it may be circular to conform to the tire. Moreover, the stem 12 may be disposed intermediate the ends of the tube 10, as shown, or it may be located at one end of the tube 10 and thereby reduce the thickness of the mass of material to be drawn through the rim aperture.

Figure 3:
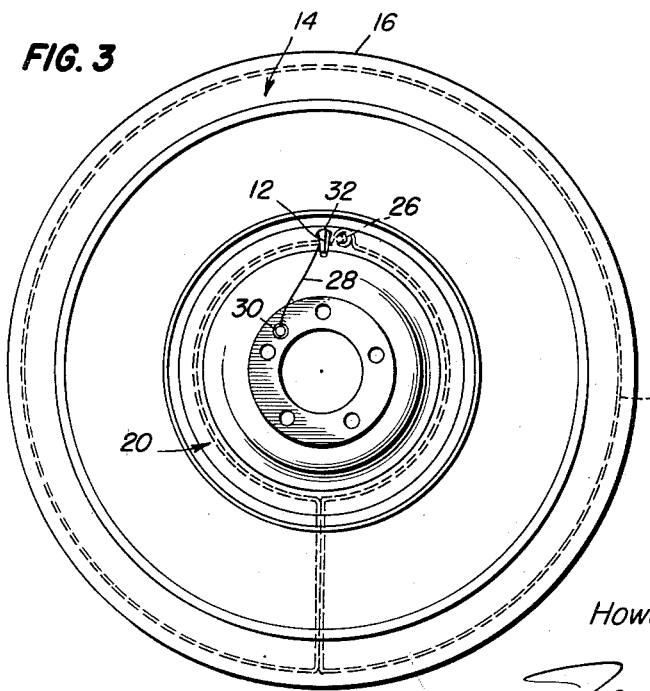
FIG. 3 is a plan view of the wheel assembly in the stage of FIG. 2.

In using the expander tube 10, a conventional tubeless type tire 14 having the normal tread 16 and free-beaded edges 18 will be mounted on a conventional drop center rim 20 having a valve stem aperture 32 and angled flanges 22 and 24 adapted to receive the beaded edges of the tire in air sealing engagement. The method of use contemplates that the operator will first engage one tire edge 18 over one rim flange 24. He will then insert the expander tube 10 inside the tire and disposed around the periphery of the tire inner wall, as shown in FIGS. 1 and 3, with the stem 12 of the tube protruding through the rim aperture 32. A resilient, compressible tire valve stem 26 will then be laid inside the tire on the center of the rim. A leader 28, previously tied or otherwise secured to the valve stem, is arranged to protrude through the rim aperture 32. A finger ring 30 is secured to the leader outside the rim. The second tire edge 18 is then forced over the other rim flange 24, and the described parts will then occupy the positions shown in FIG. 1.

Figure 2:
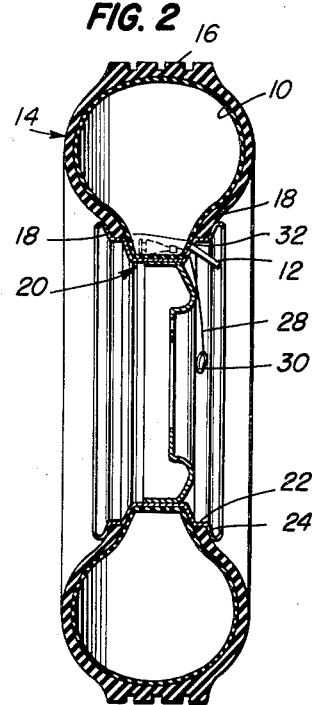
FIG. 2 is a sectional view similar to FIG. 1 showing the wheel assembly at a later stage of assembly.

With the assembly thus far made, it is impossible to inflate the tubeless tire because of the leakage between the tire edges 18 and the rim. The operator, therefore, next inflates the expander tube 10 by applying air or other fluid through the stem 12 until the tire edges 18 are forced outwardly into air sealing engagement with the rim flanges, as shown in FIG. 2. At this point, the expander tube 10 is permitted to deflate through stem 12 after which the operator pulls the tube in deflated condition through the rim aperture 32 removing it entirely from within the tire.

After removal of the tube 10, tire 14 remains in its expanded condition, pictured in FIG. 2, by reason of the friction between the tire edges 18 and the rim flanges 22. At this time, the operator will pull the ring 30 to draw the valve stem 26 into the rim opening 32. Further pulling force exerted on ring 30 or the stem 26 will fully seat valve stem 26, as illustrated in FIG. 5, by compression of the tapered portion of the resilient valve stem body. When fully seated, a circumferential groove 34 of the valve stem nests the rim portion surrounding the aperture 32 with the stem flanges on both sides of the rim making air sealing engagement with the rim. The valve cap 36 is then unscrewed, and the leader 28 removed from the valve stem. The stem normally houses a conventional valve assembly, not shown, in the stem bore 38. Inflating air is fed to the tire through stem 26 to retain the tire in its inflated state to complete the wheel assembly.

FIG. 6 illustrates a modified tire valve stem which is formed to permit ready insertion into the rim aperture 32 from the exterior of the rim. The modified valve stem 40 is also formed of compressible material, such as rubber, and is provided with a longitudinal bore 44 and a circumferential groove 48, which seats the wall of the rim aperture. The inner end 46 of the valve stem is formed with a taper having its smallest dimension at the end, and its largest dimension adjacent the groove 48. The stem 40 may be inserted into the rim aperture 32 from the exterior of the rim by pushing the stem in the direction of the arrow B, FIG. 6, as contrasted to pulling valve stem 26 in the direction of the arrow A, FIG. 5. Use of the stem 40 eliminates the need for placing a valve stem, such as 26 with connected leader 28, in the described method for mounting the tire.

FIGS. 7 and 8 illustrate a modification of the expander tube 10 which will permit more ready withdrawal from the expanded tire. A pair of leaders 52 and 54 are cemented, vulcanized, or otherwise secured to the internal end points 56 and 58, respectively, of tube 10. The leaders may be of flexible wire, tape, cord or the like. The leaders pass through the bore of the tube stem 12 to the exterior where they are secured to a pull ring 50. In withdrawing the expander tube 10 from inside a mounted tire, the operator may pull the tube stem 12 and the pull ring 50 simultaneously, or one or the other alone. When the ring 50 is pulled, the tube end points 56 and 58 will be drawn in toward the stem 12, and the tube will be at least partially inverted during withdrawal through the rim aperture. This will lessen the friction encountered by reducing the friction between the tube and the tire or rim, and materially aid in removal of the expander tube from inside the tire.

Figure 9:
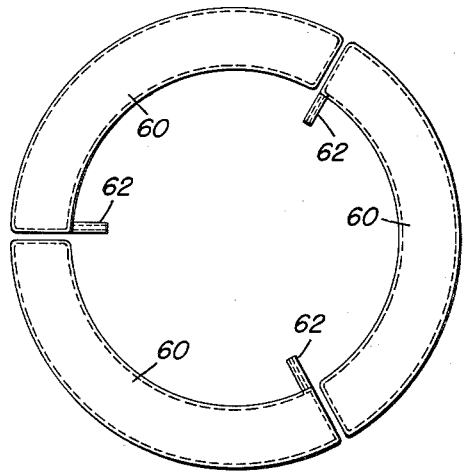
FIG. 9 is a diagrammatic plan view of a modified tire expander formed in three sections and arranged as though inside a tire, with the tire omitted.
Figure 10:
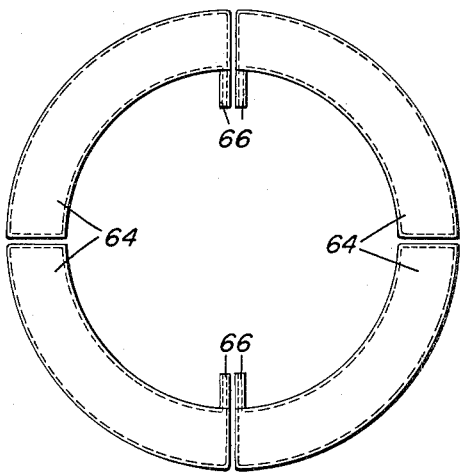
FIG. 10 is a diagrammatic view similar to FIG. 9 of a modified expander tube formed in four sections.

Another means to reduce the effort necessary to withdraw the expander tube from within the tire is to form the expander tube in sections 60 and 64, as shown in FIGS. 9 and 10. Each section may be preformed in a circular arc and provided with an inflating stem 62 and 66, respectively, preferably placed at one end. In FIG. 10, a pair of stems at adjacent ends of the expander tubes 64 are placed together for protrusion through a common rim aperture, thus a rim with two valve stem apertures would be used. In FIG. 9, a rim with three valve stem apertures would be used. The expander tube sections 60 and 64, being much shorter than the tube 10, FIG. 4, individually can be more easily withdrawn through the rim aperture.

Figure 11:
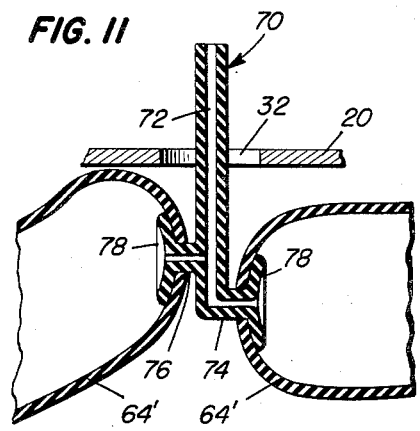
FIG. 11 is a fragmentary sectional view showing adjacent portions of a pair of expander tubes arranged to be inflated through a common valve stem.
Figure 12:
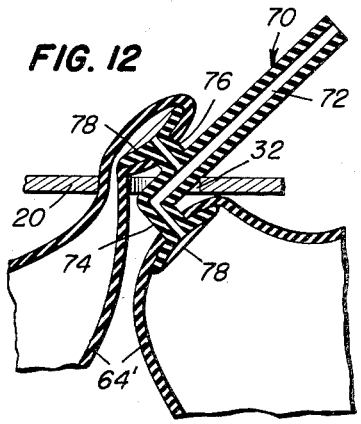
FIG. 12 is a sectional view similar to FIG. 11 showing the common valve stem and expander tubes partially withdrawn through the rim aperture.
Figure 13:
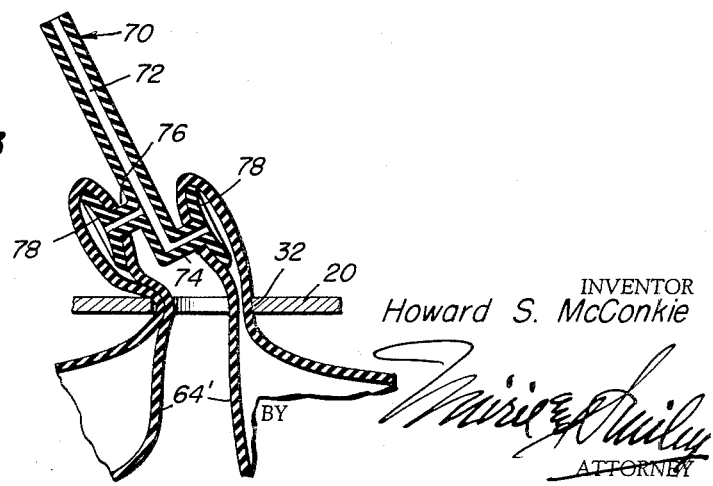
FIG. 13 is a view similar to FIG. 12 showing the parts at a later stage of withdrawal.

A modified valve stem 70, shown in FIGS. 11–13, may advantageously be used for inflation of two separate expander tube sections. The stem 70 is formed with a longitudinal bore 72 and a pair of necks or nozzles 74 and 76 at its inner end. These nozzles are provided with air passages which communicate with the bore 72 and the interior of the tube sections 64'. The nozzles 74 and 76 are oppositely directed and offset from each other for a reason to be described. Each nozzle is formed with an outturned lip 78 over which an opening in the tube section 64' may be stretched; and firmly secured, as by cementing or vulcanization. The stem 70, when thus formed, is laterally greater in dimension over the two lips 78 than is the rim opening 32, see FIG. 11, so that when inflating air is fed to the expander tube sections 64', the tendency for these sections to push out of the rim opening is prevented by the nozzles on stem 70.

However, when the expander tubes are deflated and are to be withdrawn from within the tire, the tube stem 70 may be tilted in one direction, see FIG. 12, to permit egress of the neck 76 carrying one tube section through the rim opening 32. At this time, the valve stem 70 may be tilted in the opposite direction, see FIG. 13, to permit the further withdrawal of stem 70 and neck 74 through the rim opening 32. When both necks 74 and 76 have cleared the rim aperture, the expander tube sections 64' may be withdrawn simultaneously by pulling the valve stem 70 or the sections an additional distance away from the rim.

It will be apparent that the method and apparatus described above provide a simple, efficient, and inexpensive means of mounting tubeless type tires, which heretofore have required the use of relatively expensive tools, and the time and efforts of two men to handle such tools. The expander tube, whether formed in one length or in several sections, is so inexpensive as to permit discarding without material loss, rather than repair if ruptured during use. The shorter tubes can cost only four or five cents to manufacture.

Although certain specific embodiments of the invention have been shown and described, it is obvious that many modifications thereof are possible. The invention, therefore, is not to be restricted except insofar as is necessitated by the prior art and by the spirit of the appended claims.

What is claimed and desired to be secured by Letters Patent is:

1. A tube for mounting a tubeless type tire on a rim having circumferential air sealing flanges and a valve aperture, comprising an extremely thin, tough, flexible, hollow body completely closed except for a stem bored for entrance of a filling fluid, said body being adapted to be inserted within a tubeless type tire with said stem protruding through the rim aperture, said body further being of sufficient length when filled and expanded to fill the tire completely and force the tire edges against said rim flanges in air sealing engagement therewith, said body being noncontinuous and capable of being withdrawn through said rim aperture when deflated, said hollow body being additionally provided with at least one flexible member secured to one end internally thereof and passing through said body to the exterior through said stem, whereby said body can be easily removed from the tire by pulling said member to accomplish at least partial inversion of said body and reduce the frictional forces tending to prevent withdrawal of the body from the tire.

2. In combination, a pair of expander tubes for mounting a tubeless type tire to a vehicle rim having a valve stem aperture, said pair of tubes each comprising a hollow body closed at the ends, the adjacent ends being provided with fluid passage openings, a common valve stem for said pair of tubes, a pair of outwardly projecting necks on said stem each of which is inserted in one of said fluid passage openings, said tubes being adapted to be inflated through said common valve stem to expand the tubeless type tire into air sealing engagement with the rim, said tubes being further adapted to be deflated through said common valve stem and withdrawn through the rim aperture upon application of pulling force to said common valve stem.

3. The combination according to claim 2 wherein said outwardly projecting necks are oppositely disposed and offset from each other with respect to the bore of the valve stem, the necks projecting apart a distance greater than the size of the rim aperture, whereby upon inflation of said pair of tubes the necks of the valve stem strike the wall of the rim aperture and retain the tubes within the rim and rim aperture, but upon deflation of said tubes, the said valve stem and tubes may be withdrawn through the rim aperture by first tilting the valve stem in one direction to permit egress of one of said necks, and then tilting the stem in the opposite direction to permit the withdrawal of the second neck and attached tube.

References Cited in the file of this patent

UNITED STATES PATENTS

| | | |
|---|---|---|
| 1,080,814 | Dreger et al. | Dec. 9, 1913 |
| 1,308,219 | Brucker | July 1, 1919 |
| 1,476,111 | Simes | Dec. 4, 1923 |
| 2,512,774 | Musselman | June 27, 1950 |
| 2,835,304 | Lee | May 20, 1958 |
| 2,913,035 | Lapin et al. | Nov. 17, 1959 |

FOREIGN PATENTS

| | | |
|---|---|---|
| 201,988 | Australia | May 30, 1956 |